(12) United States Patent
Kamara et al.

(10) Patent No.: US 9,077,539 B2
(45) Date of Patent: Jul. 7, 2015

(54) SERVER-AIDED MULTI-PARTY PROTOCOLS

(75) Inventors: Seny F. Kamara, Seattle, WA (US); Payman Mohassel, Calgary (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 281 days.

(21) Appl. No.: 13/043,468

(22) Filed: Mar. 9, 2011

(65) Prior Publication Data
US 2012/0233460 A1    Sep. 13, 2012

(51) Int. Cl.
H04L 29/06    (2006.01)
H04L 9/32    (2006.01)
H04L 9/08    (2006.01)

(52) U.S. Cl.
CPC ............ *H04L 9/3218* (2013.01); *H04L 9/0816* (2013.01); *H04L 2209/46* (2013.01)

(58) Field of Classification Search
CPC . H04L 9/0816; H04L 9/3218; H04L 2209/46; H04L 63/04; H04L 9/0825; H04L 9/0841; H04L 9/085; G06F 21/60
USPC ............ 713/153, 171, 193, 176; 380/28, 255, 380/282; 708/200
See application file for complete search history.

(56) References Cited

U.S. PATENT DOCUMENTS

| | | | | |
|---|---|---|---|---|
| 6,834,272 | B1 * | 12/2004 | Naor et al. | 705/80 |
| 7,181,017 | B1 * | 2/2007 | Nagel et al. | 380/282 |
| 7,240,198 | B1 * | 7/2007 | Pinkas et al. | 713/168 |
| 7,716,484 | B1 * | 5/2010 | Kaliski, Jr. | 713/176 |
| 8,108,912 | B2 * | 1/2012 | Ferris | 726/3 |
| 8,127,151 | B2 * | 2/2012 | Nelson et al. | 713/193 |
| 2003/0074330 | A1 | 4/2003 | Asokan et al. | |
| 2003/0223579 | A1 | 12/2003 | Kanter et al. | |
| 2005/0201555 | A1 | 9/2005 | Yen et al. | |
| 2005/0262009 | A1 | 11/2005 | Han et al. | |
| 2007/0156796 | A1 * | 7/2007 | Furukawa et al. | 708/200 |
| 2008/0082490 | A1 | 4/2008 | MacLaurin et al. | |
| 2009/0187757 | A1 * | 7/2009 | Kerschbaum | 713/153 |
| 2011/0060918 | A1 | 3/2011 | Pastoriza et al. | |

(Continued)

FOREIGN PATENT DOCUMENTS

WO    WO2006/103608    10/2006

OTHER PUBLICATIONS

Omote, et al., "A Second-price Sealed-bid Auction with Verifiable Discriminant of p0-th Root", Retrieved at << http://citeseerx.ist.psu.edu/viewdoc/download?doi=10.1.1.15.3203&rep=rep1&type=pdf >>, In Proceedings of Sixth International Financial Cryptography Conference, 2003.

(Continued)

*Primary Examiner* — Dustin Nguyen
(74) *Attorney, Agent, or Firm* — Dan Choi; Judy Yee; Micky Minhas

(57) ABSTRACT

The disclosed architecture employs techniques that make secure multi-party computation (MPC) practical and scalable. In support of utilizing cloud computing, for example, for evaluating functionality, a third party server can be employed which does not have any input to the computation and does not receive any output from the computation, yet has a vast amount of computational resources. Accordingly, the secure MPC architecture can outsource as much as possible of the computation and communications burden of the parties without the server(s) learning any information about the party inputs.

23 Claims, 7 Drawing Sheets

(56) References Cited

U.S. PATENT DOCUMENTS

| | | | |
|---|---|---|---|
| 2011/0110525 A1 | 5/2011 | Gentry | |
| 2011/0138184 A1* | 6/2011 | Kolesnikov | 713/171 |
| 2011/0211692 A1 | 9/2011 | Raykova et al. | |
| 2012/0002811 A1* | 1/2012 | Smart | 380/255 |
| 2012/0070000 A1* | 3/2012 | Baechler et al. | 380/255 |
| 2012/0213359 A1* | 8/2012 | Troncoso Pastoriza et al. | 380/28 |
| 2013/0254532 A1 | 9/2013 | Raykova et al. | |

OTHER PUBLICATIONS

Brandt, Felix., "Cryptographic Protocols for Secure Second-Price Auctions", Retrieved at << http://citeseerx.ist.psu.edu/viewdoc/download?doi=10.1.1.13.2263&rep=rep1&type=pdf >>, 2001.

Parkes, et al., "Practical Secrecy-Preserving, Verifiably Correct and Trustworthy Auctions", Retrieved at << http://www.eecs.harvard.edu/econcs/pubs/ecra07.pdf >>, Proceedings of the 8th International Conference on Electronic Commerce: The new e-commerce—Innovations for Conquering Current Barriers, Obstacles and Limitations to Conducting Successful Business on the Internet, Aug. 13-16, 2006.

Tygar, J D., "Atomicity versus Anonymity: Distributed Transactions for Electronic Commerce", Retrieved at << http://citeseerx.ist.psu.edu/viewdoc/download?doi=10.1.1.133.5536&rep=rep1&type=pdf >>, Proceedings of 24rd International Conference on Very Large Data Bases, Aug. 24-27, 1998.

Miltersen, et al., "Privacy-Enhancing First-Price Auctions Using Rational Cryptography", Retrieved at << http://www.daimi.au.dk/~bromille/Papers/pea.pdf >>, 2009.

Armknecht, F. et al., "A New Approach for Algebraically Homomorphic Encryption," Technical Report 2008/422, IACS ePrint Cryptography Archive, 2008, 18 pages.

Babai, L. et al., "Checking Computations in Polylogarithmic Time," STOC '91: Proceedings of the Twenty-Third Annual ACM Symposium on Theory of Computing, 1991, 16 pages.

Beaver, D. et al., "The Round Complexity of Secure Protocols (Extended Abstract)," Proceedings of the Twenty-Second Annual ACM Symposium on Theory of Computing, 1990, pp. 503-513.

Canetti, R. et al.; "Universally Composable Two-Party and Multi-Party Secure Computation"; Jul. 14, 2003; 86 pages.

Canetti, R.; "Universally Composable Security: A New Paradigm for Cryptographic Protocols"; ePrint Archive, Report 2000/067; Dec. 15, 2005; 131 pages.

Catrina, O. et al., "Fostering the Uptake of Secure Multiparty Computation in E-Commerce"; Proceedings of the 2008 Third International Conference on Availability, Reliability and Security; 2008; pp. 693-700.

Cramer, R. et al., "Multiparty Computation from Threshold Homomorphic Encryption," Basic Research in Computer Science, BRICS RS-00-14, Jun. 2000, 43 pages.

Damgard, I. et al.; "Constant-Round Multiparty Computation Using a Black-Box Pseudorandom Generator"; CRYPTO 2005; Aug. 10, 2005; 20 pages.

Damgard, I. et al.; "Scalable Secure Multiparty Computation," CRYPTO 2006, 2006, 20 pages.

Endo, et al.; "A Proposal of Encoded Computations for Distributed Massively Multiplayer Online Services"; Proceedings of the 2006 ACM SIGCHI International Conference on Advances in Computer Entertainment Technology; Jun. 14-16, 2006; Hollywood, CA; 6 pages.

Goldreich, O. et al., "How to Play any Mental Game," Course Presentation for CS 590T, Fall 2004, 40 pages.

Goldreich, O. et al., "How to Play Any Mental Game or a Completeness Theorem for Protocols with Honest Majority (Extended Abstract)," Proceedings of the Nineteenth Annual ACM Symposium on Theory of Computing, 1987, pp. 218-229.

Goldreich, O.; "Secure Multi-Party Computation, Version 1.4"; Department of Computer Science and Applied Mathematics, Weizmann Institute of Science; Rehovot, Israel; Jun. 1998, revised Oct. 27, 2002; 110 pages.

Goldwasser, S. et al., "Delegating Computation: Interactive Proofs for Muggles," STOC '08: Proceedings of the 40th Annual ACM Symposium on Theory of Computing, May 17-20, 2008, Victoria, British Columbia, Canada, 10 pages.

Horng, G., "A Secure Server-Aided RSA Signature Computation Protocol for Smart Cards," Journal of Information Science and Engineering, No. 16, 2000, pp. 847-855.

"Interactive Proof System," retrieved at http://en.wikipedia.org/wiki/Interactive_proof_system, Wikipedia entry, retrieved on Oct. 26, 2009, 5 pages.

Lindell, Y., "Efficient Fully-Simulatable Oblivious Transfer," retrieved at <<http://eprint.iacr.org/2008/035.pdf>>, extended abstract appears in CRT-RSA 2008, 2008, 17 pages.

Lindell, Y. et al., "A Proof of Yao's Protocol for Secure Two-Party Computation," Journal of Cryptology, vol. 22, No. 2; Jul. 23, 2004, pp. 161-188.

Peikert, C. et al., "A Framework for Efficient and Composable Oblivious Transfer," Proceedings of the 28th Annual Conference on Cryptology (CRYPTO '08), 2007, 28 pages.

Yao, A., "Protocols for Secure Computations," IEEE Symposium on Foundations of Computer Science (FOCS '82), 1982, pp. 160-164.

Abadi, M. et al.; "On hiding information from an oracle"; Proceedings of the Nineteenth Annual ACM Symposium on Theory of Computing (STOC 1987); 1987; pp. 195-203.

Ben-David, A. et al.; "FairplayMP: a system for secure multi-party computation"; ACM Conference on Computer and Communications Security; 2008; pp. 257-266.

Bogetoft, P. et al.; "Secure multiparty computation goes live"; Financial Cryptography and Data Security; Springer-Verlag; 2009; pp. 325-343.

Bogetoft, P. et al.; "A practical implementation of secure auctions based on multiparty integer computation"; Financial Cryptography and Data Security; vol. 4107 of Lecture Notes in Computer Science; Springer; 2006; pp. 142-147.

Boneh, D. et al.; "Evaluating 2-DNF Formulas on Ciphertexts"; Theory of Crytography Conference; vol. 3378 of Lecture Notes in Computer Science; Springer; 2005; pp. 325-342.

Canetti, R.; "Security and composition of multi-party cryptographic protocols"; Journal of Cryptology; vol. 13, No. 1; Sep. 9, 1999; 56 pages.

Canetti, R.;; "Universally composable security: A new paradigm for cryptographic protocols (Extended Abstract)"; IEEE $42^{nd}$ Annual Symposium on the Foundations of Computer Science; 2001; 10 pages (in two parts).

Chaum, D. et al. "Multiparty unconditionally secure protocols"; ACM Symposium on Theory of Computing; 1988; pp. 11-19.

Even, S. et al.; "A randomized protocol for signing contracts"; Communications of the ACM; vol. 28, No. 6; 1985; pp. 637-647.

Feige, U. et al.; "A minimal model for secure computation"; ACM Symposium on Theory of Computing; New York, NY; 1994; pp. 554-563.

Feigenbaum, J.; "Encrypting problem instances: Or . . . can you take advantage of someone without having to trust him?"; Advances in Cryptology, CRYPTO 1985, Lecture Notes in Computer Science; Springer; 1986; pp. 477-488.

El Gamal, T.; "A public key cryptosystem and a signature scheme based on discrete logarithms"; Advance in Cryptology, CRYPTO 1984, Lecture Notes in Computer Science; Springer; 1985; pp. 10-18.

Gentry, C.; "Fully homomorphic encryption using ideal lattices"; ACM Symposium on Theory of Computing; 2009; pp. 169-178.

Ishai, Y. et al.; "Private simultaneous messages protocols with applications"; Israel Symposium on the Theory of Computing Systems; IEEE Computer Society; Washington, D.C.; 1997; pp. 174-183.

Lindell, Y. et al.; "An efficient protocol for secure two-party computation in the presence of malicious adversaries"; Proceedings of the $26^{th}$ Annual International Conference on Advances in Cryptology; Berlin, Heidelberg, Springer-Verlag; 2007; pp. 52-78.

Lindell, Y. et al.; "Implementing two-party computation efficiently with security against malicious adversaries"; Proceedings of the $6^{th}$ International Conference on Security and Cryptography for Networks; Berlin, Heidelberg, Springer-Verlag; 2008; pp. 2-20.

(56) References Cited

OTHER PUBLICATIONS

Malkhi, D. et al.; "Fairplay—a secure two-party computation system"; USENIX Security Symposium; USENIX Association; 2004; 17 pages.
Matsumoto, T., et al.; "Speeding up secret computations with insecure auxiliary devices"; Advances in Cryptology—CRYPTO 1990; Springer-Verlag; 1990; pp. 497-506.
Naor, M. et al.; "Privacy preserving auctions and mechanism design"; ACM Conference on Electronic Commerce; New York, NY; 1999; pp. 129-139.
Paillier, P.; "Public-key cryptosystems based on composite degree residuosity classes"; Advances in Cryptology—Eurocrypt '99; vol. 1592, Lecture Notes in Computer Science; Springer-Verlag; 1999; pp. 223-238.
Pfitzmann, B. et al.; "Attacks on protocols for server-aided RSA computation"; vol. 658, Lecture Notes in Computer Science; Springer-Verlag; 1992; pp. 153-163.
Pinkas, B. et al.; "Secure two-party computation is practical"; Advances in Cryptology—ASIACRYPT '09; Springer-Verlag; 2009; pp. 250-267.
Rabin, M.; "How to exchange secrets by oblivious transfer"; Technical Report TR-81; Aiken Computation Lab; Harvard University; May 20, 1981; 26 pages.
Sander, T. et al.; "Non-interactive cryptocomputing for NC1"; IEEE Symposium on Foundations of Computer Science; 1999; p. 554.
Yao, A.; "How to generate and exchange secrets"; IEEE Symposium on Foundations of Computer Science; 1986; pp. 162-167.
Applebaum et al., "From Secrecy to Soundness: Efficient Verification Via Secure Computation", International Colloquium on Automata, Languages and Programming, pp. 152-163, 2010.
Alwen et al., "Collusion-Free Multiparty Computation in the Mediated Model", Advances in Cryptology—CRYPTO '09, pp. 524-540, 2009.
Alwen et al., "Collusin-Free Protocols in the Mediated Model", Advances in Cryptology—CRYPTO '08, pp. 497-514, 2008.
Chung et al., "Improved Delegation of Computation Using Fully Homomorphic Encryption", Advances in Cryptology—CRYPTO '10. vol. 6223 of Lecture Notes in Computer Science, pp. 483-501, 2010.
Dachman-Soled et al., "Efficient Robust Private Set Intersection", Proceedings of the 7th International Conference on Applied Cryptography and Network Security, pp. 125-142, 2009.
Dachman-Soled et al., "Secure Efficient Multiparty Computing of Multivariate Polynomials and Applications", Applied Cryptography and Network Security, pp. 130-146. Springer, 2011.
De Cristofaro et al., "Linear-Complexity Private Set Intersection Protocols Secure in Malicious Model", Financial Cryptography, 2010.
Freedman et al., "Efficient Private Matching and Set Intersection", Proceedings of Eurocrypt 2004, vol. 3027 of LNCS, pp. 1-19. Springer-Verlag, May 2004.
Gennaro et al., "Non-Interactive Verifiable Computing: Outsourcing Computation to Untrusted Workers", Advances in Cryptology—CRYPTO '10, vol. 6223 of Lecture Notes in Computer Science, pp. 465-482, 2010.
Goldwasser et al., "Fair Computation of General Functions in Presence of Immoral Majority" Advances in Cryptology—CRYPTO '90, pp. 77-93, 1991.
Goldwasser et al., "Secure Computation without Agreement", International Conference on Distributed Computing, pp. 17-32, 2002.
Hazay et al., "Efficient Protocols for Set Intersection and Pattern Matching with Security Against Malicious and Covert Adversaries", Theory of Cryptography Conference—TCC 2008, Springer-Verlag LNCS 4948, pp. 155-175, 2008.

Hazay et al., "Efficient Set Operations in the Presence of Malicious Adversaries", Public Key Cryptography, PKC 2010, pp. 312-331, 2010.
Jarecki et al., "Efficient Oblivious Psuedorandom Function with Applications to Adaptive OT and Secure Computation of Set Intersection", TCC, pp. 577-594. Springer, 2009.
Kissner et al., "Privacy-Preserving Set Operations", Advances in Cryptology—CRYPTO '05, pp. 241-257, 2005.
Lepinksi et al., "Collusion-Free Protocols", Proceedings of the Thirty-Seventh Annual ACM Symposium on Theory of Computing, pp. 543-552. 2005.
Mohassel et al., "Efficiency Tradeoffs for Malicious Two-Party Computation", Conference on Theory and Practice of Public-Key Cryptography, vol. 3958, LNSC, pp. 458-473, 2006.
Micali, Silvio, "CS Proofs", IEEE Symposium on Foundations of Computer Science, pp. 436-453, 1994.
Micali et al., "Secure Computation (Abstract)", Advances in Cryptology—CRYPTO '91, pp. 392-404, 1992.
Raykova et al., "Secure Computation Using a Server Module", U.S. Appl. No. 13/855,186, filed Apr. 2, 2013.
Kolesnikov, et al., "A Practical Universal Circuit Construction and Secure Evaluation of Private Functions", 2008, pp. 83-97.
Lindell, et al., "A Proof of Security of Yao's Protocol for Two-Party Computation", Journal of Cryptolology. vol. 22, 2009, pp. 161-188.
Kamara, et al., "Outsourcing Multi-Party Computation", Cryptology ePrint archive, Oct. 25, 2011, 41 pages.
Beaver, Donald, "Foundations of Secure Interactive Computing", in Advances in Cryptology—CRYPTO '91, Springer-Verlag, 1992, pp. 377-391.
Goldreich, et al., "How to Play Any Mental Game", ACM, 1987, pp. 218-229.
"Restriction Requirement for U.S. Appl. No. 12/713,206", Mailed Date: Feb. 10, 2012, 7 pages.
"Response to Restriction Requirement for U.S. Application No. 12/713,206", Mailed Date: Feb. 10, 2012, Filed Date: Feb. 29, 2012, 7 pages.
"Non-Final Office Action for U.S. Appl. No. 12/713,206", Mailed Date: Apr. 27, 2012, 10 pages.
"Response to Non-Final Office Action for U.S. Appl. No. 12/713,206", Mailed Date: Apr. 27, 2012, Filed Date: Jul. 13, 2012, 12 pages.
"Applicant Initiated Interview Summary for U.S. Appl. No. 12/713,206", Mailed Date: Oct. 17, 2012, 3 pages.
"Notice of Allowance for U.S. Appl. No. 12/713,206", Mailed Date: Oct. 23, 2012, 17 pages.
"Request for Continued Examination for U.S. Appl. No. 12/713,206", filed Dec. 13, 2012, 3 pages.
"Examiner Initiated Interview Summary for U.S. Appl. No. 12/713,206", Mailed Date: Jan. 4, 2013, 2 pages.
"Notice of Allowance for U.S. Appl. No. 12/713,206", Mailed Date: Jan. 7, 2013, 8 pages.
"Amendment after Notice of Allowance for U.S. Appl. No. 12/713,206", Mailed Date: Jan. 7, 2013, Filed Date: Feb. 7, 2013, 3 pages.
"Restriction Requirement for U.S. Appl. No. 13/855,186", Mailed Date: Nov. 6, 2014, 7 pages.
Goldreich, Oded, "The Foundations of Cryptography", vol. 2, Cambridge University Press, 2004, 798 pages.
U.S. Appl. No. 13/855,186; Restriction Requirement Mailed Nov. 6, 2014, 7 pages.
U.S. Appl. No. 13/855,186; Response to Restriction Requirement Mailed Nov. 6, 2014, filed Dec. 19, 2014, 8 pages.
U.S. Appl. No. 13/855,186; Non Final Office Action Mailed Jan. 27, 2015, 11 pages.
Response Filed Apr. 30, 2015 to the Non-Final Office Action Mailed Jan. 27, 2015 From U.S. Appl. No. 13/855,186, 11 pages.

* cited by examiner

SERVER-AIDED MULTI-PARTY PROTOCOLS

CROSS-REFERENCE TO RELATED APPLICATIONS

This application is related to pending U.S. patent application Ser. No. 12/713,206 entitled "Secure Computation Using a Server Module" and filed on Feb. 26, 2010.

BACKGROUND

A protocol for secure multi-party computation (MPC) allows a set of parties, each with a private input, to securely evaluate functionality (e.g., of a computational device) over party inputs. Generally, a secure MPC protocol should guarantee, (1) that the parties will not learn any information from the protocol other than the associated party output and what is inherently leaked from the output, (2) that the functionality was computed correctly, and (3) that all the inputs are independent. Performing secure computations over private data can enable organizations to mine data while preserving user privacy and make possible secure electronic voting.

However, many of the existing improvements in efficiency rely on new and more efficient instantiations of the cryptographic primitives and protocols underlying the generic MPC results. While the improvements in efficiency may be substantial, even the most efficient solutions cannot scale to handle the kind of massive datasets currently available. Indeed, at a certain scale, even plain non-secure algorithms become infeasible. Thus, the prospect of executing any MPC protocol is unreasonable.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs different and complimentary approaches to making secure multi-party computation (MPC) practical, and in particular, to making MPC scale. In addition to the parties that desire to evaluate the functionality that operates on party input and provides outputs to the parties, there is a third party that does not have any input to the computation and does not receive any output from the computation, yet has a vast amount of computational resources. The third party is referred to the server (one or more servers) and the environment that utilizes such a server (one or more servers), as server-aided MPC.

The architecture discloses multi-party protocols for securely computing functionality as provided by the server. For example, in one implementation, a multi-party (e.g., two-party) server-aided protocol is provided that is secure in the presence of non-colluding parties and, a malicious server or malicious party. Another multi-party server-aided protocol addresses the situation of a non-colluding malicious party by employing cut-and-choose on the malicious party circuits and inputs. Yet another multi-party server-aided protocol addresses the situation of a semi-honest server and a malicious party. Still another multi-party server-aided protocol for the specific functionality of (1,n)-oblivious transfer addresses the situation of a malicious server.

The disclosed architecture finds particular application to outsourced computation, also known as "cloud computing", where a service provider offers clients access to an unlimited amount of computing resources. Accordingly, the disclosed secure MPC can outsource as much of the computation and communication burden of the parties as possible without the server learning any information about the party inputs.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
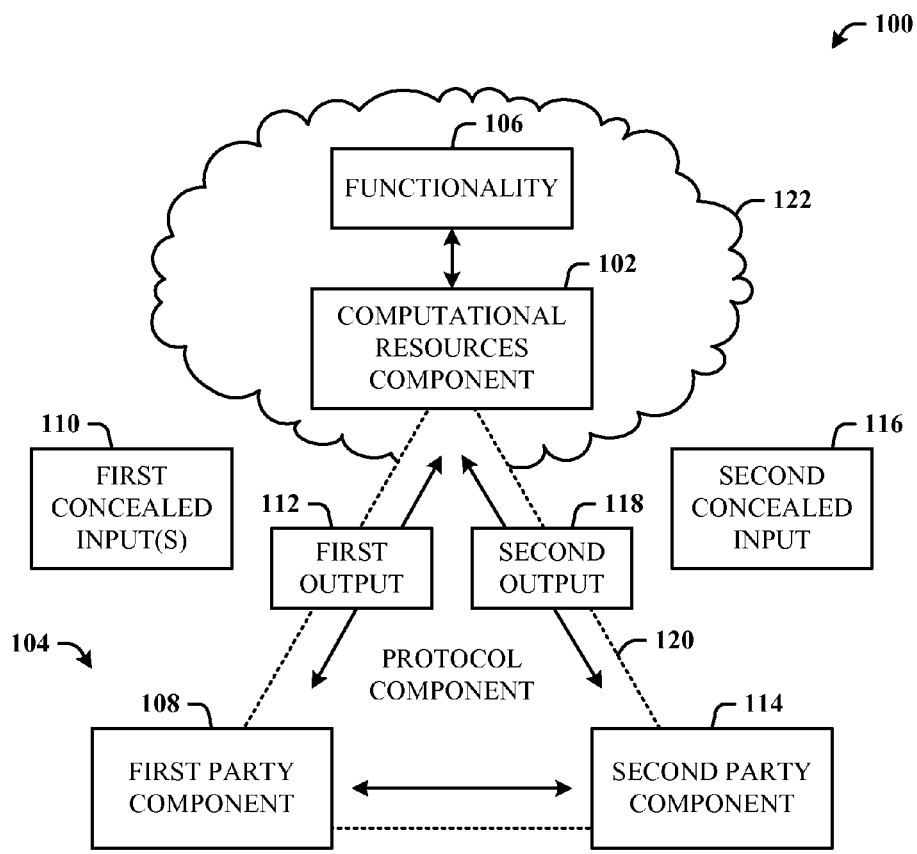
FIG. 1 illustrates multi-party computation system in accordance with the disclosed architecture.

Secure multi-party computation (MPC) protocols can be roughly categorized as protocols that employ garbled circuit techniques and protocols that are based on secret sharing. However, in the current state, neither approach readily lends itself to the server-aided setting in which a server is employed to perform or assist in the computation. In one garbled circuit approach one party "garbles" a circuit that computes the functionality while the other party evaluates the functionality. Outsourcing either the garbling operation or the evaluation operation to the server would immediately leak information about the party inputs.

In the case of protocols based on secret sharing, each party shares its input among all the other parties. The parties then evaluate the functionality on the shares the parties hold in order to obtain a share of the final output. The output is then reconstructed using the shares of all the participants. In this approach, security crucially depends on each of the intermediate values of the computation being shared among all participants. Clearly, outsourcing the party computation to a single server would allow recovery of the inputs.

Another approach relies on fully-homomorphic encryption, which allows the evaluation of arbitrary circuits on encrypted messages. With this approach, the evaluation of the functionality can be done by a single party using the encryptions of the other party inputs. However, existing fully-homomorphic encryption techniques are insufficient for practical use. Other improvements include partially-homomorphic encryption schemes with practical efficiency, schemes that allow the evaluation of intermediate classes of functionalities such as quadratic formulas and NC1 circuits (circuits that employ polylogarithmic depth and polynomial size), and an encryption scheme that can be used to evaluate circuits of bounded depth.

The disclosed architecture employs approaches that make secure MPC practical and scalable. In support of utilizing cloud computing, for example, for evaluating functionality, a third party server can be employed which does not have any input to the computation and does not receive any output from the computation, yet has a vast amount of computational resources. Accordingly, the disclosed secure MPC architecture attempts to outsource as much as possible of the computation and communications burden of the parties without the server(s) learning any information about the party inputs. The architecture discloses three general-purpose constant-round (meaning, a constant number of rounds, where "round" means the number of interactions) server-aided two-party protocols for Boolean circuits and a special-purpose protocol for a 1-out-of-n oblivious transfer. These protocols are described in detail hereinbelow.

Following is preliminary information and notations that are utilized in describing the disclosed protocols, related at least in part, to entities that are malicious, colluding, non-colluding, semi-honest, and so on.

As notation, $x \leftarrow \chi$ represents an element x being sampled from a distribution $\chi$, and $$x \xleftarrow{\$}$$

X represents an element x being sampled uniformly from a set X. The output x of an algorithm A is denoted by $x \leftarrow A$. The ith element of a vector v is referred to as either $v_i$ or v[i]. Throughout the description, k refers to the security parameter. A function $v: \mathbb{N} \to \mathbb{N}$ is negligible in k if for every polynomial $p(\cdot)$ and sufficiently large k, $v(k)<1/p(k)$. Let poly(k) and negl(k) denote unspecified polynomial and negligible functions in k, respectively. There exists a polynomial $p(\cdot)$ such that for all sufficiently large k, $f(k) \leq p(k)$, which is written as $f(k)=poly(k)$, and there exists a negligible function $v(\cdot)$ such that for all sufficiently large k, $f(k) \leq v(k)$, written as $f(k)=negl(k)$.

With respect to multi-party functionalities, an n-party randomized functionality is a function $f: \mathbb{N} \times (\{0,1\}^*)^n \times \{0,1\}^* \to \{0,1\}^*$, where the first input is the security parameter k, the second input is a vector of strings $\bar{x}$, the third input is a set of random coins r, and the output is a vector of strings. In the context of MPC, each party $P_i$ holds an input $x_i$ and wants to receive output $y_i$, where $\bar{y} \leftarrow f(k, \bar{x}, r)$ for $$r \xleftarrow{\$} \{0, 1\}^{poly(k)}.$$

(Throughout the description, the security parameter and the coins are omitted for brevity, resulting in $\bar{y} \leftarrow f(\bar{x})$.) The functionality is deterministic if the functionality only takes the security parameter and the strings $\bar{x}$ as inputs, and the functionality is symmetric if all parties receive the same output. The description focuses on deterministic functionalities, since a protocol for securely computing deterministic functionalities can be used to securely compute randomized functionalities.

With respect to encryption, a private-key encryption scheme or protocol Π is a set of three polynomial-time algorithms (Gen, Enc, Dec) such that algorithm Gen takes a security parameter k in unary and returns a secret key K, algorithm Enc takes a key K and an n-bit message m and returns a ciphertext c, and algorithm Dec takes a key K and a ciphertext c, and returns message m if key K was the key under which ciphertext c was produced.

Informally, a private-key encryption scheme is considered secure against chosen-plaintext attacks (CPA) if the ciphertext the encryption scheme outputs does not leak any useful information about the plaintext, even to an adversary that can adaptively query an encryption oracle. A public-key encryption scheme is defined analogously, with the exception that the key generation algorithm Gen outputs a public and private key pair (pk, sk), the encryption algorithm Enc takes the public-key as input, and the decryption algorithm Dec takes the secret key sk. An encryption scheme can sometimes be directed to have an elusive and verifiable range, which generally means that it can be verified (efficiently) whether a ciphertext c was generated under a given key.

An entity (e.g., party, server) can be colluding or non-colluding. In existing security definitions for secure MPC, a monolithic adversary A is oftentimes assumed that corrupts a subset of the participants, and consequently learns and uses the participant private inputs in adversary computation and communications. In practice, monolithic adversaries capture a variety of attack scenarios. In particular, the monolithic adversaries capture situations where multiple participants collude with each other and combine all participant information in order to cheat against the honest participants.

The protocols disclosed protocols are based on a conventional two-party protocol for semi-honest adversaries, which conventional protocol is now reviewed. Let circuit C be a Boolean circuit and protocol Π=(Gen, Enc, Dec) be a CPA-secure private-key encryption scheme that has an elusive and verifiable range. The protocol proceeds in two phases: a garbling phase where one of the parties (or parties), referred to as the sender, generates a garbled circuit G(C), and an evaluation phase where the other party, referred to as the receiver, evaluates the garbled circuit G(C). The garbled circuit comprises garbled gates along with output decryption tables.

To generate the garbled circuit, the sender begins by generating two secret keys $(K_w^0, K_w^1)$ for each wire w in the circuit. For each gate g the sender then builds a garbled table $T_g$ as follows. Let $w_a$ and $w_b$ be the input wires of gate g and $w_c$ be its output wire. Denote $(K_a^0, K_a^1, K_b^0, K_b^1, K_c^0, K_c^1)$ the six keys associated with gate g. Table $T_g$ can comprise the following ciphertexts c permuted in a random order:

$$c_{0,0}:=Enc_{K_a^0}(Enc_{K_b^0}(K_c^{g(0,0)}))$$

$$c_{0,1}:=Enc_{K_a^0}(Enc_{K_b^1}(K_c^{g(0,1)}))$$

$$c_{1,0}:=Enc_{K_a^1}(Enc_{K_b^0}(K_c^{g(1,0)}))$$

$$c_{1,1}:=Enc_{K_a^1}(Enc_{K_b^1}(K_c^{g(1,1)})).$$

Note that given a pair of keys $K_a^b$ and $K_b^{b'}$, where b, b'∈{0,1}, the key $K_c^{g(b,b')}$ can be recovered by attempting to decrypt each ciphertext. Since the encryption scheme is verifiable, only the decryption of ciphertexts $c_{b,b'}$ will succeed, resulting in the key $K_c^{g(b,b')}$. The sender then builds a translation table, which maps the keys associated with the output wires of the gates in the last layer of the circuit to the bits the keys represent.

Given a set of n keys (for the input wires) that correspond to a particular input string, the entire circuit can be evaluated gate by gate, each time using keys output from the previous garbled table to decrypt and recover the appropriate key to decrypt the next one. When the last layer of the circuit is reached, the translation table can be used to map the resulting keys to the output of the evaluation.

During the evaluation phase, the sender sends garbled circuit G(C) to the receiver along with the keys corresponding to the sender input and the translation table. The receiver then obtains the keys corresponding to the receiver input from the sender. This is accomplished privately (e.g., without the sender learning anything about the receiver's input) using a series of 1-out-of-2 oblivious transfers (OTs). The OT protocols allow the receiver to select one out of two keys held by the sender in such a way that (1) the sender does not learn which key was selected, and (2) the receiver learns nothing about the key that was not selected. Using all the garbled inputs, the receiver evaluates G(C) and uses the translation table to recover the output. Note that the evaluation of the garbled circuit has a negligible error probability.

Following are general-purpose server-aided two-party MPC protocols in accordance with the disclosed architecture. The two-party server-aided protocols are described for securely computing any functionality.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates multi-party computation system 100 in accordance with the disclosed architecture. The system 100 comprises a computational resources component 102 that provides computational resources to parties 104 of secure multi-party communications. The computational resources include functionality 106 sought by the parties 104 for evaluation.

The system 100 also comprises a first party component 108 of the parties 104 that sends one or more first concealed inputs 110 to the computational resources component 102, and receives a first output 112 derived from the functionality 106. The system 100 also comprises a second party component 114 of the parties 104 that sends a second concealed input 116 to the computational resources component 102, and receives a second output 118 derived from the functionality 106.

A protocol component 120 is provided via which the parties 104 perform secure MPC communications with the computational resources component 102 to access the functionality 106, input the first and second concealed inputs (110 and 116) to the computational resources component 102, and receive the first and second outputs (112 and 118) from the computational resources component 102. The protocol component 120 performs secure constant-round communications using garbled circuit technology to prevent the computation resources component 102 from providing input to computation of the functionality 106 and receiving output from the computation of the functionality 106. The computational resource component 102 can be part of one or more servers of a cloud computing framework 122 that provides the computational resources for server-aided secure multi-party communications.

The protocol component 120 can employ a garbled (Boolean) circuit created by the first party component 108 and used by the computational resources component 102 to evaluate the first and second concealed inputs (110 and 116) and provide the first and second outputs (112 and 118). This version of protocol component 120 is secure in the presence of non-colluding parties 104, and either a malicious server (the resources component 102) or a malicious second party 114.

Alternatively, the protocol component 120 employs multiple garbled circuits and multiple concealed inputs created by the first party component 108. The computational resources component 102 selects a subset of the garbled circuits, verifies correct generation of the subset by the first party component 108 and, continues evaluation the first and second concealed inputs (110 and 116) and provides the first and second outputs (112 and 118) based on the correct generation. In this case, the protocol component 102 is secure in the presence of non-colluding parties 104 and, a malicious server (the resources component 102), a malicious first party 108, and/or a malicious second party 114.

Still alternatively, the protocol component 120 can employ a first garbled circuit created by the first party component 108 and a second garbled circuit created by the second party component 114. The computational resources component 102 compares the first and second garbled circuits, and continues evaluation based on favorable comparison of the first and second garbled circuits to provide the first and second outputs (112 and 118). In this scenario, the protocol component 120 is secure in the presence of a semi-honest server (the resources component 102) and at most one malicious party (of the parties 104).

Yet again alternatively, the protocol component 120 can employ keys generated at the first party component 108 and second party component 114 based on execution of a cryptographic protocol. The first party component 108 creates ciphertexts using multiple keys generated from one of the keys and sends the ciphertexts, permuted in a random order, to the computational resources component 102, where the ciphertexts are decrypted using one key of the multiple keys. The one key that decrypts the ciphertexts is sent to the second party component 114 to derive an output at the second party component 114 based on the one key.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2:
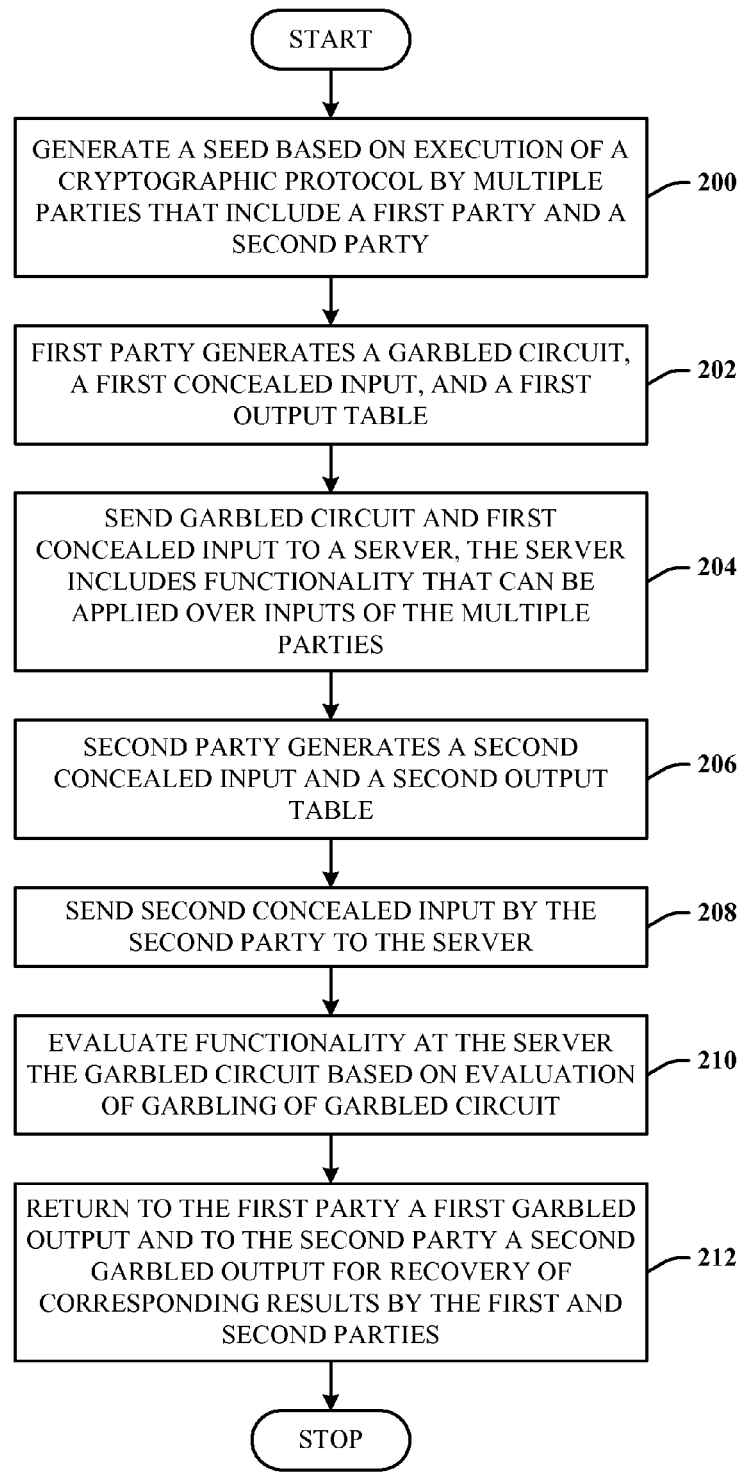
FIG. 2 illustrates a first exemplary MPC protocol for secure multi-party computation in accordance with the disclosed architecture.

FIG. 2 illustrates a first exemplary MPC protocol for secure multi-party computation in accordance with the disclosed architecture. The first protocol is a two-party server-aided protocol that is secure in the presence of non-colluding parties and, either a malicious server or a malicious $P_2$, as represented by the following adversary structure:

$$A=\{(S[m,nc],P_1[sh,nc],P_2[sh,nc]),(S[sh,nc], P_1[sh,nc],P_2[m,nc])\}$$

At 200, a seed is generated based on execution of a cryptographic protocol (e.g., coin toss) by multiple parties that include a first party (Party $P_1$) and a second party (Party $P_2$). At 202, the first party generates a garbled circuit, a first concealed input (e.g., garbled input), and a first output table.

At 204, the garbled circuit and first concealed input are sent to a server. The server includes functionality that can be applied over inputs of the multiple parties. At 206, the second party generates a second concealed input and a second output table. At 208, the second concealed input is sent by the second party to the server. At 210, the functionality is evaluated at the server based on evaluation of garbling of the garbled circuit. At 212, the server returns to the first party a first garbled output and to the second party a second garbled output for recovery of corresponding results by the first and second parties.

In a more specific example embodiment of the first protocol, Parties $P_1$ and $P_2$ execute a coin tossing protocol to generate a k-bit seed s. Party $P_1$ uses the seed s to generate a garbled circuit G(C), garbled input G(x) (e.g., the first concealed input), and an output table. Party $P_1$ sends the garbled circuit G(C) and garbled input G(x) to the server S. Party $P_2$ uses the seed s to generate an associated garbled input G(y) (e.g., a second concealed input) and an output table. Party $P_2$ then sends its garbled input to the server S. Server S evaluates the garbled circuit G(C) on the Parties $P_1$ and $P_2$ respective garbled inputs G(x) and G(y). Server S returns to the Parties $P_1$ and $P_2$ the respective garbled outputs. Parties $P_1$ and $P_2$ use the output tables to recover $f(x,y)$ according to the functionality $f$ on input x and input y.

The method can further comprise recovering a first result at the first party based on the first garbled output and the first output table and recovering a second result at the second party based on the second garbled output and the second output table.

The first party, the second party, and the server can be non-colluding parties and the server is malicious. The first party, the second party, and the server can be non-colluding parties and the second party is malicious. The server is part of a cloud computing system and the other parties are remote from the cloud computing system.

Figure 3A:
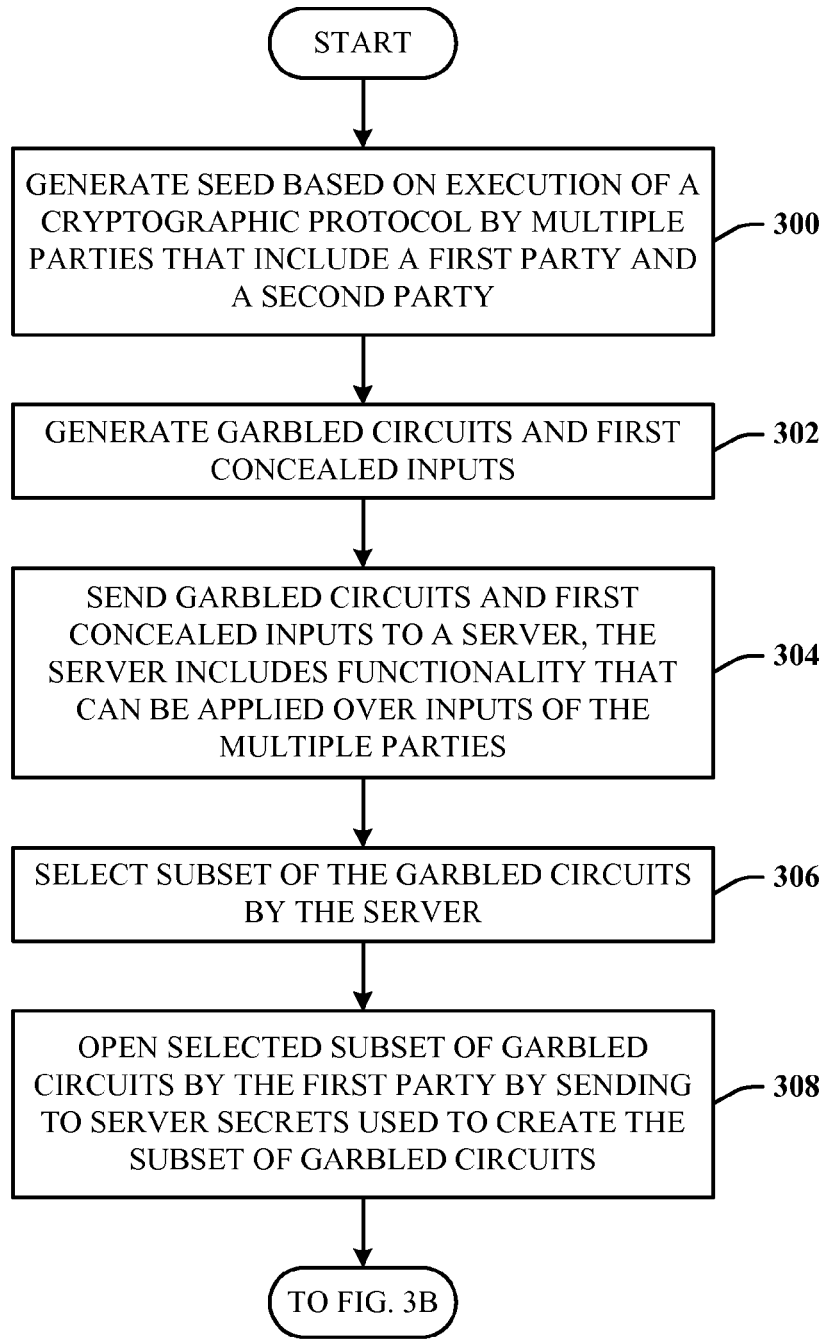
FIG. 3A and FIG. 3B illustrate a second exemplary MPC protocol for secure multi-party computation in accordance with the disclosed architecture.
Figure 3B:
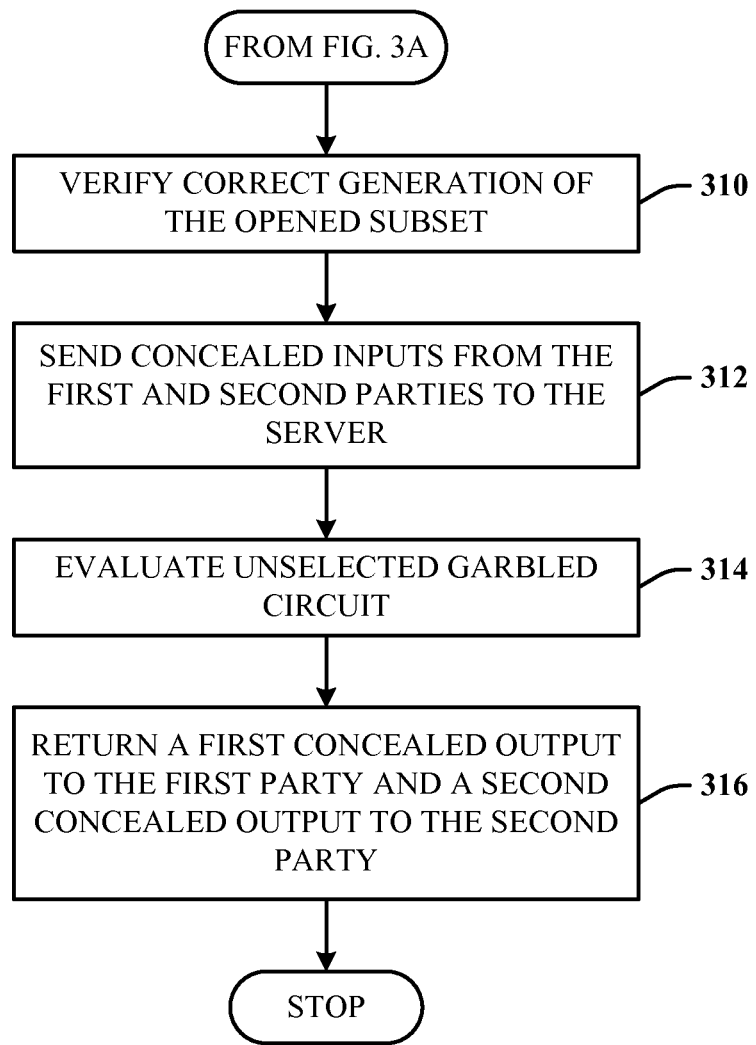

FIG. 3 illustrates a second exemplary MPC protocol for secure multi-party computation in accordance with the disclosed architecture. To handle a (non-colluding) malicious $P_1$, the previous protocol is augmented in this second protocol by performing cut-and-choose on party $P_1$'s garbled circuits and inputs. The following protocol is secure for the following adversary structure, $$A=\{(S[m,nc],P_1[sh,nc],P_2[sh,nc]),(S[sh,nc],P_1[m,nc], P_2[m,nc])\}$$

At 300, a seed is generated based on execution of a cryptographic protocol by multiple parties that include a first party and a second party. At 302, garbled circuits and first concealed inputs are generated. At 304, the garbled circuits and first concealed inputs are sent to a server. The server includes functionality that can be applied over inputs of the multiple parties. At 306, a subset of the garbled circuits is selected by the server. At 308, the selected subset of garbled circuits is opened by the first party by sending to the server secrets used to create the subset of garbled circuits. At 310, correct generation of the opened subset is verified. At 312, the concealed inputs are sent from the first and second parties to the server. At 314, an unselected garbled circuit is evaluated. At 316, a first concealed output is returned from the server to the first party and a second concealed output is returned from the server to the second party. The method can further comprise aborting computation at the server if the verification fails.

In a more specific example embodiment of the second protocol, Parties $P_1$ and $P_2$ execute a coin tossing protocol to generate a k-bit seed s. Party $P_1$ uses the seed s to generate λ garbled circuits $(G_1(C), \ldots, G_\lambda(C))$, and λ garbled inputs $(G_1(x), \ldots, G_\lambda(x))$. Party $P_1$ sends all the garbled circuits and garbled inputs to server S. Server S randomly chooses a number of circuits and requests party $P_1$ to open the selected circuits by sending the input tables associated with the selected garbled circuits to party $P_1$. Server S verifies that the opened circuits were generated correctly. If the verification fails for a circuit, server S aborts; otherwise, the verification succeeds, and server S continues. Parties $P_1$ and $P_2$ send garbled inputs to server S. Server S evaluates one of the remaining garbled circuits and returns the garbled output to Parties $P_1$ and $P_2$.

The first party, the second party, and the server can be non-colluding parties and the server is malicious. The first party, the second party, and the server can be non-colluding parties and, the first party is malicious. The server can be part of a cloud computing system and the other parties are remote from the cloud computing system.

Figure 4:
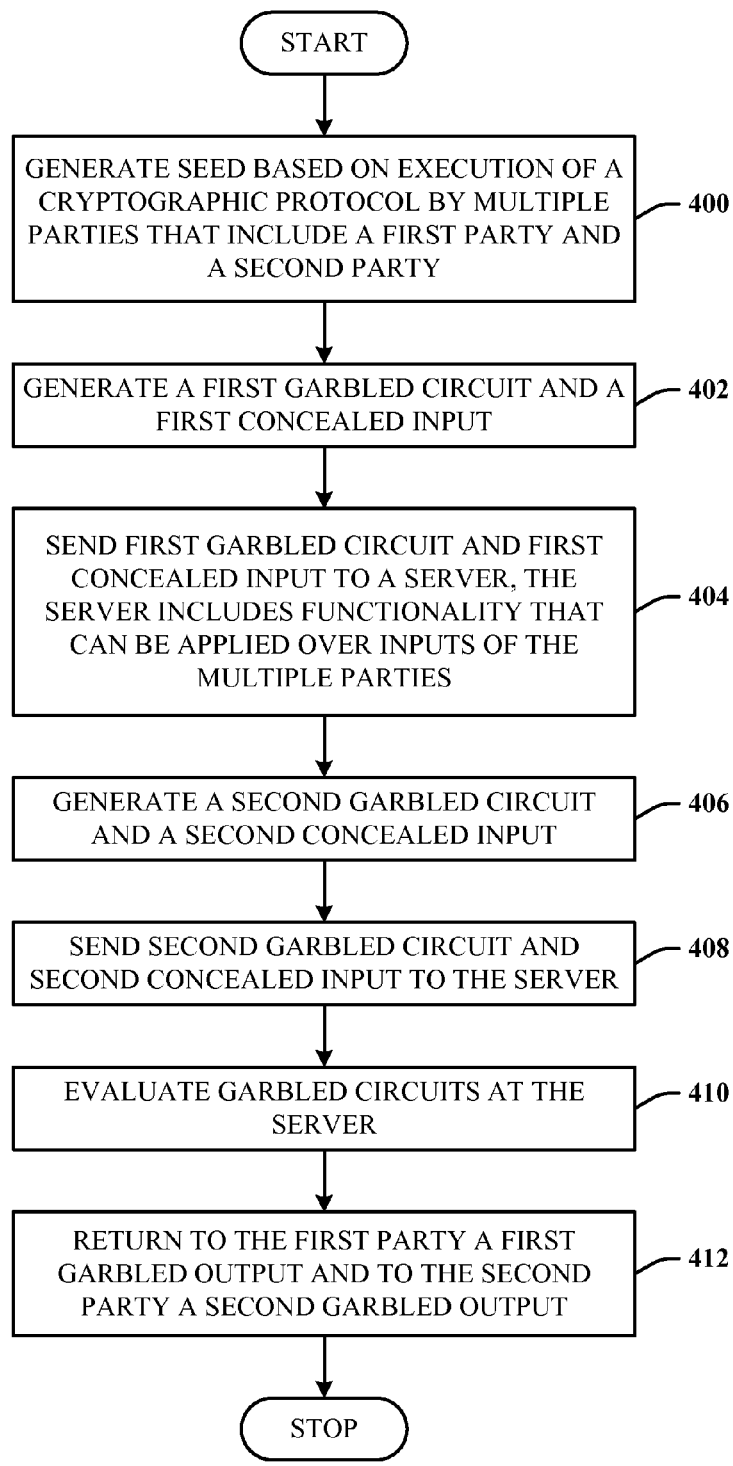
FIG. 4 illustrates a third exemplary MPC protocol for secure multi-party computation in accordance with the disclosed architecture.

FIG. 4 illustrates a third exemplary MPC protocol for secure multi-party computation in accordance with the disclosed architecture. The third protocol is secure in the presence of a semi-honest server and at most one malicious party, as represented by the following adversary structure, $$A=\{(S[sh,nc],P_1[m,nc],P_2[sh,nc]),(S[sh,nc],P_1[sh, nc],P_2[m,nc])\}$$

At 400, a seed is generated based on execution of a cryptographic protocol by multiple parties that include a first party and a second party. At 402, a first garbled circuit and a first concealed input are generated. At 404, the first garbled circuit and first concealed input are sent from the first party to a server. The server includes functionality that can be applied over inputs of the multiple parties. At 406, a second garbled circuit and a second concealed input are generated. At 408, the second garbled circuit and second concealed input are sent from the second party to the server.

At 410, the garbled circuits are evaluated at the server. At 412, a first garbled output is returned to the first party and a second garbled output is returned to the second party. The method can further comprise aborting the computation at the server if the first garbled circuit does not compare favorably to the second garbled circuit.

In a more specific example embodiment of the third protocol, Parties $P_1$ and $P_2$ execute a coin tossing protocol to generate a k-bit seed s. Party $P_1$ uses seed s to generate a garbled circuit $G_1(C)$ and garbled input G(x), and then sends the garbled circuit $G_1(C)$ and garbled input G(x) to server S. Party $P_2$ uses seed s to generate a garbled circuit $G_2(C)$ and garbled input G(y), and then sends garbled circuit $G_2(C)$ and garbled input G(y) to server S. If $G_1(C) \neq G_2(C)$, server S aborts; otherwise, server S continues. Server S evaluates the garbled circuits $G_1(C)$ and $G_2(C)$, and returns the garbled outputs to the respective Parties $P_1$ and $P_2$.

The server can be semi-honest and at most one of the first party or the second party is malicious. The server can be part of a cloud computing system and the other parties are remote from the cloud computing system.

Figure 5:
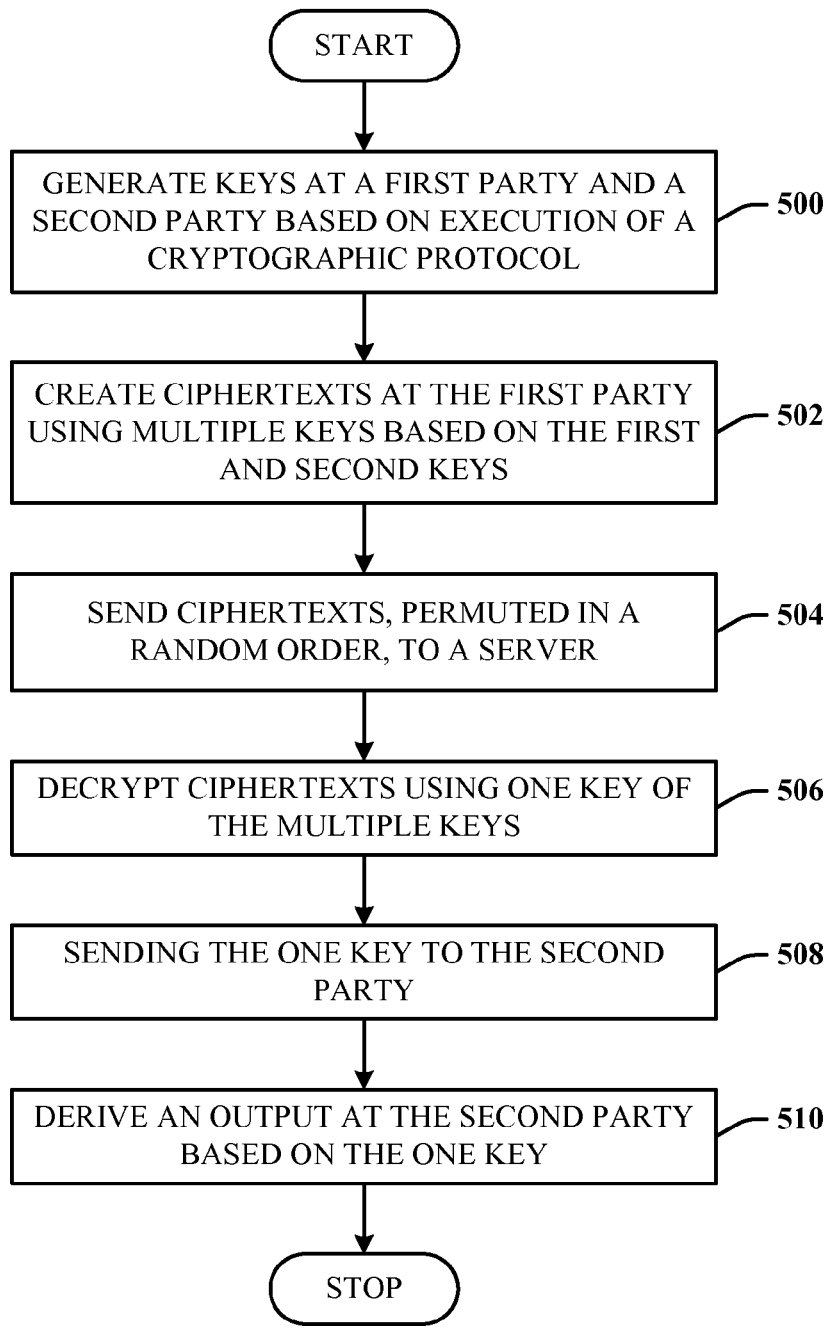
FIG. 5 illustrates a fourth exemplary MPC protocol for secure multi-party computation in accordance with the disclosed architecture.

FIG. 5 illustrates a fourth exemplary MPC protocol for secure multi-party computation in accordance with the disclosed architecture. The fourth protocol is a server-aided (1, n)-oblivious transfer protocol. The fourth protocol makes use of an authenticated private-key encryption scheme $\Sigma_1$=(Gen, Enc, Dec) and a private-key encryption scheme with an elusive and verifiable range $\Sigma_2$=(Gen, Enc, Dec) and a pseudo-random function F.

At 500, keys are generated at a first party and a second party based on execution of a cryptographic protocol. At 502, ciphertexts are created at the first party using multiple keys based on the first and second keys. At 504, the ciphertexts, permuted in a random order, are sent to a server. At 506, the ciphertexts are decrypted using one key of the multiple keys. At 508, the one key is sent to the second party. At 510, an output is derived at the second based on the one key.

The method can further comprise computing at the second party, second keys, based on the multiple keys, and sending the second keys to the server. The method can further comprise employing an authenticated private-key encryption scheme, a private-encryption scheme with verifiable range, and a pseudo-random function.

In a more specific example embodiment of the fourth protocol, Parties $P_1$ and $P_2$ each execute a cryptographic protocol (e.g., a coin tossing protocol) to generate two respective keys $K_1$ and $K_2$. Party $P_1$ generates keys $(K_1, \ldots, K_n)$ where $K_i \leftarrow F_{K_1}(i)$. Party $P_1$ then computes for $1 \leq i \leq n$, ciphertext $c_i \leftarrow \Sigma_2 \cdot \text{Enc}_{K_i}(\Sigma_1 \cdot \text{Enc}_{K_2}(a_i))$ and sends ciphertexts $(c_1, \ldots, c_n)$, permuted in a random order, to server S. Party $P_2$ computes key $K_i \leftarrow F_{K_1}(i)$ and sends key $K_i$ to server S. Server S attempts to decrypt all the ciphertexts using key $K_i$. At most, one key will successfully decrypt the ciphertext, which decrypted ciphertext is denoted $c_i'$. Server S then sends decrypted ciphertext $c_i'$ to party $P_2$. Party $P_2$ then computes $a_i \leftarrow \Sigma_1 \cdot \text{Dec}_{K_2}(c_i')$ and outputs $a_i$, if $a_i \neq \bot$.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
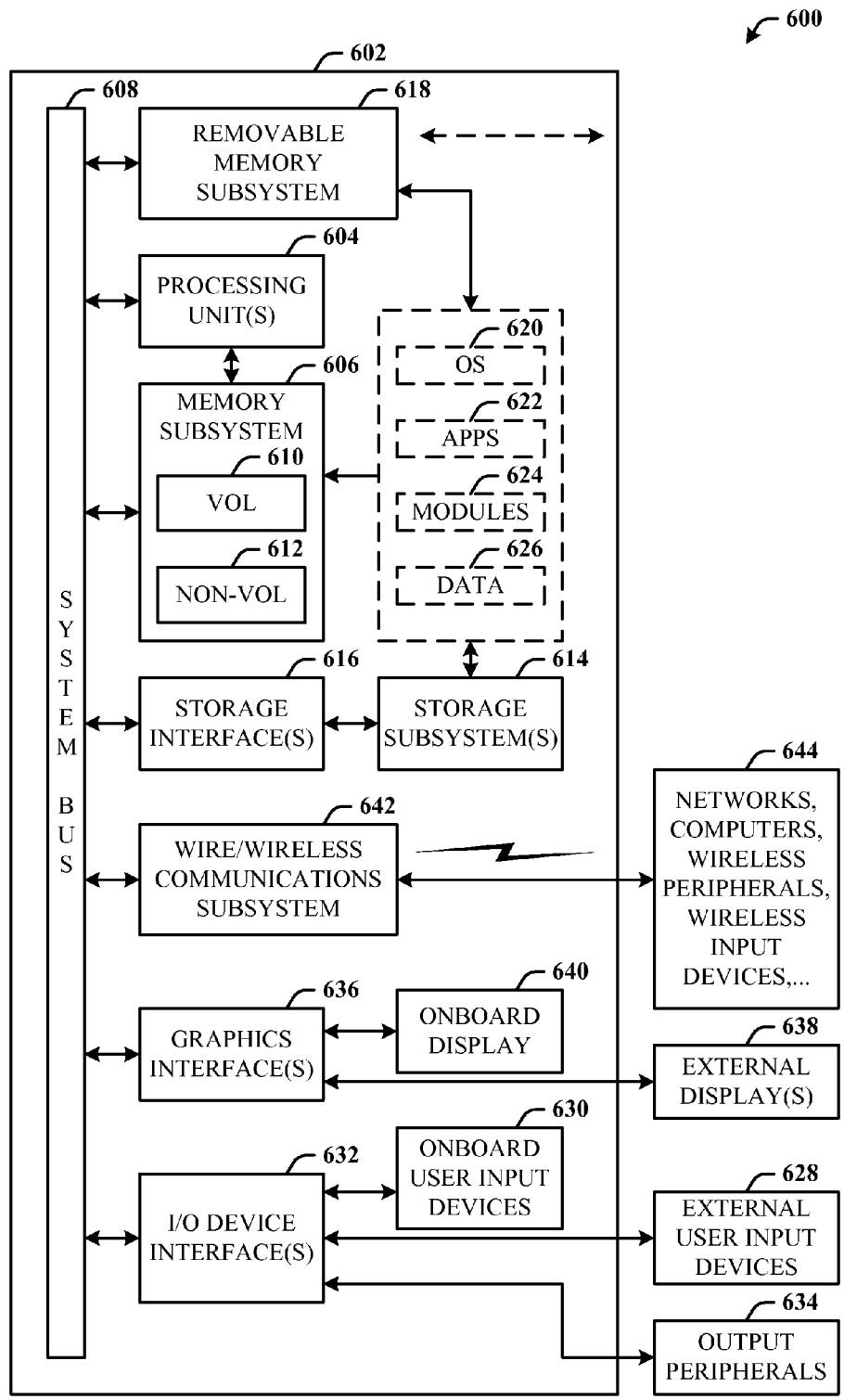
FIG. 6 illustrates a block diagram of a computing system that executes server-aided secure multi-party computation in accordance with the disclosed architecture.

Referring now to FIG. 6, there is illustrated a block diagram of a computing system 600 that executes server-aided secure multi-party computation in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a computer-readable storage such as a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include computer-readable storage (physical storage media) such as a volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components. The storage subsystem(s) 614 (physical storage media) can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The an operating system 620, one or more application programs 622, other program modules 624, and program data 626 can include the entities and components of the system 100 of FIG. 1, and the protocols represented by the flowcharts of FIGS. 2-5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 602 and includes volatile and non-volatile internal and/or external media that is removable or non-removable. For the computer 602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A server system comprising:
    at least one processing unit; and
    at least one storage device or volatile or non-volatile memory device storing computer-executable instructions that, when executed by the at least one processing unit, cause the at least one processing unit to:
        obtain a first concealed input from a first party,
        obtain an entirety of a garbled circuit from the first party,
        obtain a second concealed input from a second party,
        provide the first concealed input and the second concealed input to computational resources,
        obtain a first garbled output and a second garbled output from the computational resources,
        send the first garbled output to the first party, and
        send the second garbled output to the second party.

2. The server system of claim 1, embodied as a single computing device.

3. The server system of claim 1, wherein the computer-executable instructions cause the at least one processing unit to:
    perform constant-round communications with the first party and the second party.

4. The server system of claim 1, further comprising the computational resources.

5. A method performed by a first party using at least one computer processing unit, the method comprising:
    generating, by the first party, a seed based on execution of a cryptographic protocol by multiple parties that include the first party and a second party;
    generating, by the first party, an entirety of a garbled circuit, a first concealed input, and a first output table;
    sending the entirety of the garbled circuit and the first concealed input from the first party to a server configured to apply functionality over inputs of the multiple parties, the inputs including at least the first concealed input and a second concealed input provided to the server by the second party; and obtaining, by the first party, a first garbled output from the server, wherein a first corresponding result is recoverable from the first garbled output using the first output table.

6. The method of claim 5, further comprising:
executing, by the first party, a coin tossing protocol with the second party to generate the seed.

7. The method of claim 5, wherein the first output table is generated based on the seed.

8. The method of claim 5, wherein the server is part of a cloud computing system and at least the first party is remote from the cloud computing system.

9. The method of claim 5, further comprising:
recovering the first corresponding result at the first party based on the first garbled output and the first output table.

10. A server system comprising:
at least one processing unit; and
at least one storage device or volatile or non-volatile memory device storing computer-executable instructions that, when executed by the at least one processing unit, cause the at least one processing unit to:
in a first instance:
obtain garbled circuits and a first concealed input from a first party;
select a subset of the garbled circuits;
obtain secrets usable to open the selected subset of garbled circuits;
open the subset of the garbled circuits using the secrets to obtain an opened subset of circuits while leaving an individual garbled circuit unopened;
verify correct generation of the opened subset of circuits;
obtain a second concealed input from a second party;
perform a computation on the first concealed input and the second concealed input using the individual garbled circuit that is left unopened to obtain a first concealed output and a second concealed output; and
send the first concealed output to the first party and the second concealed output to the second party.

11. The server system of claim 10, wherein the computer-executable instructions cause the at least one processing unit to:
in a second instance:
obtain other garbled circuits and another first concealed input from another first party for performing another computation;
select another subset of the other garbled circuits;
obtain other secrets;
attempt to open the another subset of the other garbled circuits;
make another determination that the another subset was incorrectly generated; and
abort the another computation responsive to the another determination.

12. The server system of claim 10, wherein the subset of garbled circuits is selected randomly by the server system.

13. The server system of claim 10, wherein the secrets comprise input tables.

14. The server system of claim 13, wherein the computer-executable instructions cause the at least one processing unit to:
request the input tables from the first party.

15. A server system comprising:
at least one processing unit; and
at least one storage device or volatile or non-volatile memory device storing computer-executable instructions that, when executed by the at least one processing unit, cause the at least one processing unit to:
in a first instance:
obtain, from a first party, a first garbled circuit and a first concealed input,
obtain, from a second party, a second garbled circuit and a second concealed input,
perform a comparison of the first garbled circuit to the second garbled circuit to determine whether to perform a computation using at least one of the first garbled circuit or the second garbled circuit, and
abort the computation based on the comparison.

16. The server system of claim 15, wherein the computer-executable instructions cause the at least one processing unit to:
in a second instance:
obtain, from another first party, another first garbled circuit and another first concealed input,
obtain, from another second party, another second garbled circuit and another second concealed input,
perform another comparison of the another first garbled circuit to the another second garbled circuit to determine whether to perform another computation,
based on the another comparison, perform the another computation using at least one of the another first garbled circuit and the another second garbled circuit to obtain a first garbled output and a second garbled output,
return, to the first party, the first garbled output, and
return, to the second party, the second garbled output.

17. The server system of claim 16, wherein:
the comparison indicates the first garbled circuit is not equivalent to the second garbled circuit, and
the another comparison indicates the another first garbled circuit is equivalent to the another second garbled circuit.

18. The server system of claim 15, wherein the server is part of a cloud computing system and the first party and the second party are remote from the cloud computing system.

19. A method performed by at least one computer processing unit, the method comprising:
in a first instance:
obtaining garbled circuits and a first concealed input from a first party;
selecting a subset of the garbled circuits to open;
obtaining secrets usable to open the selected subset of garbled circuits;
opening the subset of the garbled circuits using the secrets to obtain an opened subset of circuits while leaving an individual garbled circuit unopened;
verifying correct generation of the opened subset of circuits;
obtaining a second concealed input from a second party;
perform a computation on the first concealed input and the second concealed input using the individual garbled circuit that is left unopened to obtain a first concealed output and a second concealed output; and
sending the first concealed output to the first party and the second concealed output to the second party.

20. The method of claim 19, further comprising:
in a second instance:
- obtaining other garbled circuits and another first concealed input from another first party for performing another computation;
- selecting another subset of the other garbled circuits;
- obtaining other secrets;
- attempting to open the another subset of the other garbled circuits using the other secrets;
- making another determination that the another subset was incorrectly generated; and
- aborting the another computation responsive to the another determination.

21. The method of claim 20, further comprising selecting the selected subset of the garbled circuits and the another subset of the other garbled circuits randomly.

22. The method of claim 19, wherein the secrets comprise input tables.

23. The method of claim 22, further comprising:
requesting the input tables from the first party.

* * * * *